United States Patent [19]
Dolgoff

[11] Patent Number: 5,491,585
[45] Date of Patent: Feb. 13, 1996

[54] PORTABLE REAR SCREEN TELEVISION CABINET

[75] Inventor: Eugene Dolgoff, Westbury, N.Y.

[73] Assignee: Projectavision, Inc., New York, N.Y.

[21] Appl. No.: 224,053

[22] Filed: Apr. 7, 1994

Related U.S. Application Data

[63] Continuation of Ser. No. 979,135, Nov. 20, 1992, abandoned.

[51] Int. Cl.⁶ ................................................... G03B 21/56
[52] U.S. Cl. .......................... 359/449; 348/788; 352/104; 353/78
[58] Field of Search .................................. 359/449, 460, 359/453, 456; 353/73, 74, 77, 78; 352/104; 348/787, 788, 789

[56] References Cited

U.S. PATENT DOCUMENTS 2,320,760  6/1943  Surre ......................................... 353/10
3,522,982  8/1970  Hughes ..................................... 359/450
3,536,390  10/1970 Dine et al. ................................. 353/73
3,560,088  2/1971  Schwartz ................................... 353/78
3,870,411  3/1975  Schwartz et al. .......................... 353/73

Primary Examiner—Richard A. Wintercorn
Attorney, Agent, or Firm—Anderson Kill Olick & Oshinsky

[57] ABSTRACT

A rear screen television cabinet, comprising a cabinet having front portions including a top, two sides and a front face, viewing surface on the front face, a mirror system comprising a plurality of mirrors for reflecting and successively enlarging and reflecting an incident beam onto the rear screen and a rear assembly which substantially closes said cabinet and is foldable or collapsible to render said cabinet portable, is disclosed. The cabinet's mirror system receives and successively enlarges and reflect an incident beam from a projector, to project a large image onto the viewing surface.

16 Claims, 5 Drawing Sheets

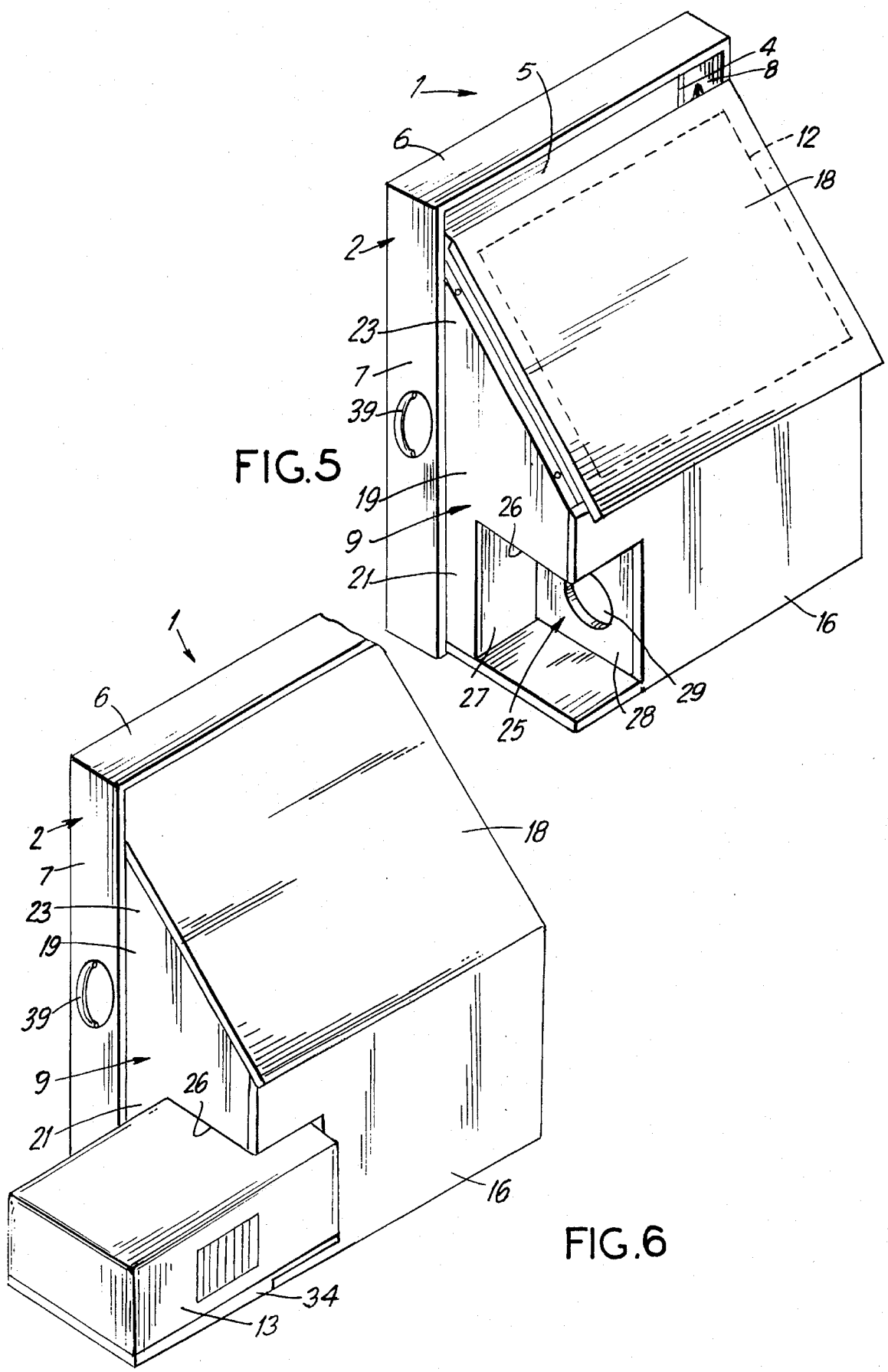

5,491,585

PORTABLE REAR SCREEN TELEVISION CABINET

This is a continuation application of Ser. No. 07/979,135, filed Nov. 20, 1992, now abandoned.

FIELD OF THE INVENTION

The present invention is directed to video display systems and more particularly to a portable rear-screen television cabinet.

BACKGROUND OF THE INVENTION

Rear-screen televisions today typically consist of a giant cabinet containing mirrors and a video projector within the cabinet. Such cabinets are very big, cumbersome and the optics therein must be carefully aligned, particularly if there are three images emanating from three CRTs in the cabinet. If the projector and mirrors inside the cabinet are moved in relation to the screen, the image would be poor because proper convergence would be destroyed and would result in color fringing.

Projection televisions which do not require a screen and which project an image directly onto a wall are however a more recent phenomenon and are described in Dolgoff U.S. Pat. No. 5,012,274. However, where there is, for example, inadequate wall space, or if the wall is painted a dark color, or the wall has rough surfaces, or the wall is in a very brightly lit room, such projection televisions are not as useful.

Accordingly, an object of the present invention is to permit viewing of an image from a projector where there is inadequate wall space.

Another object of the invention is to permit viewing of an image from a projector in a brightly lit room or where the wall conditions are less than optimal for viewing a projected image.

Yet another object of the invention is to provide a rear screen video cabinet which is foldable and easily portable.

SUMMARY OF THE INVENTION

These and other objects of the invention, which shall become apparent hereafter, are achieved by a portable rear screen television cabinet having mirrors in the unit. The cabinet requires simply the "plugging in" of a projector unit thereto. The cabinet unfolds from a very thin profile into a cabinet sufficiently deep to hold mirrors and the projector and to maintain the proper angles which permit the image to be enlarged onto the screen. The cabinet can be light-weight and is easily disassembled and foldable, to be easily transported.

BRIEF DESCRIPTION OF THE DRAWINGS

The invention will be better understood by the Detailed Description of the Preferred Embodiments, in connection with the drawings, of which:

FIG. 5 is a rear perspective view of the Portable Rear Screen Television Cabinet with the mirror panel closing the cabinet;

FIG. 6 is a rear perspective view of the Portable Rear Screen Television Cabinet with the projector connected thereto;

DETAILED DESCRIPTION OF THE PREFERRED EMBODIMENTS

Figure 1:
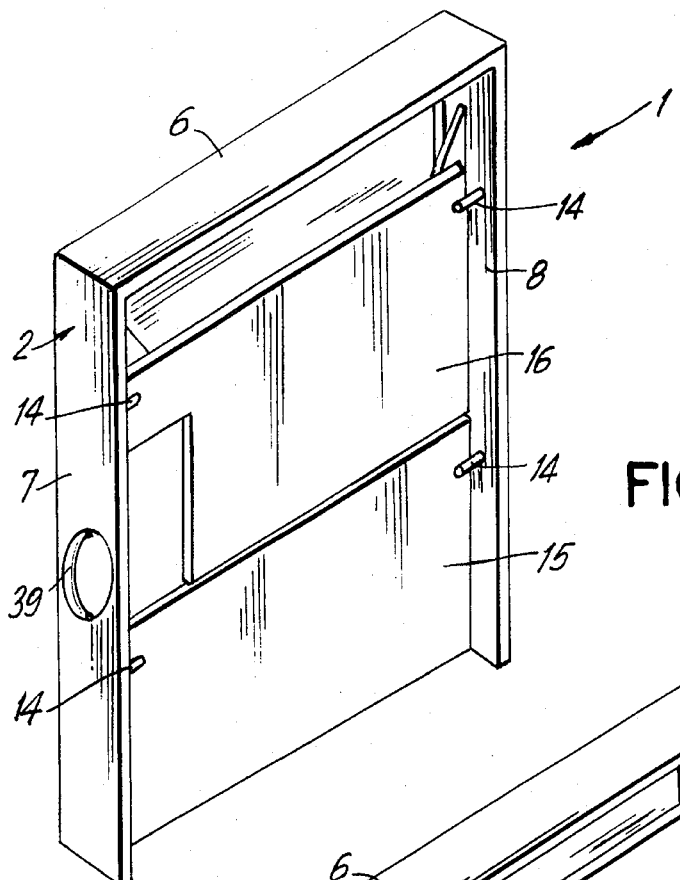
FIG. 1 is a rear perspective view of the Portable Rear Screen Television Cabinet in a folded state.
Figure 4:
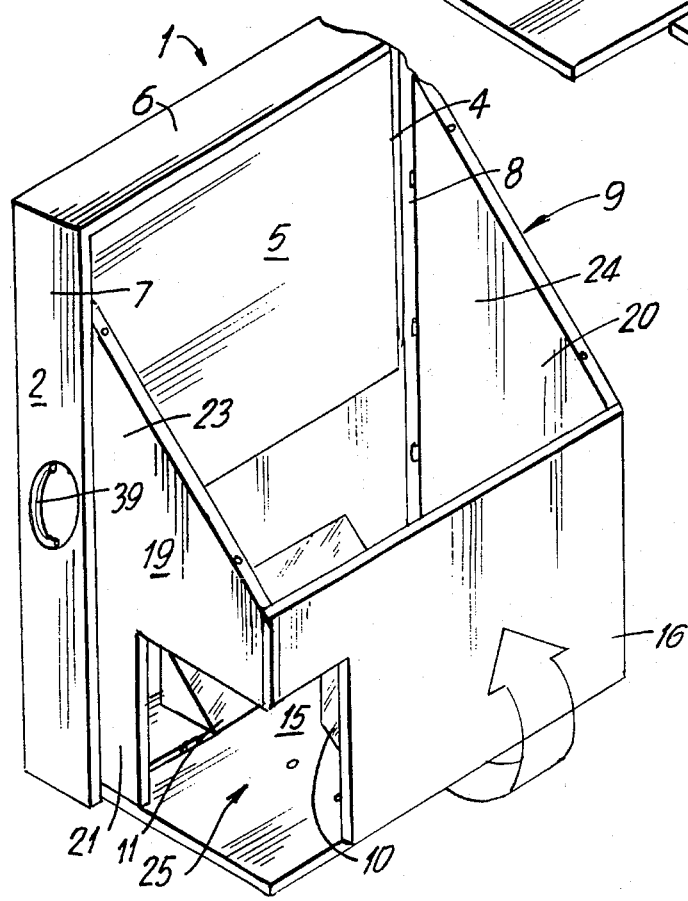
FIG. 4 is a rear perspective view of the Portable Rear Screen Television Cabinet with the rear panel swung upward into its operational position after the side panels have been moved into its operational position.
Figure 7:
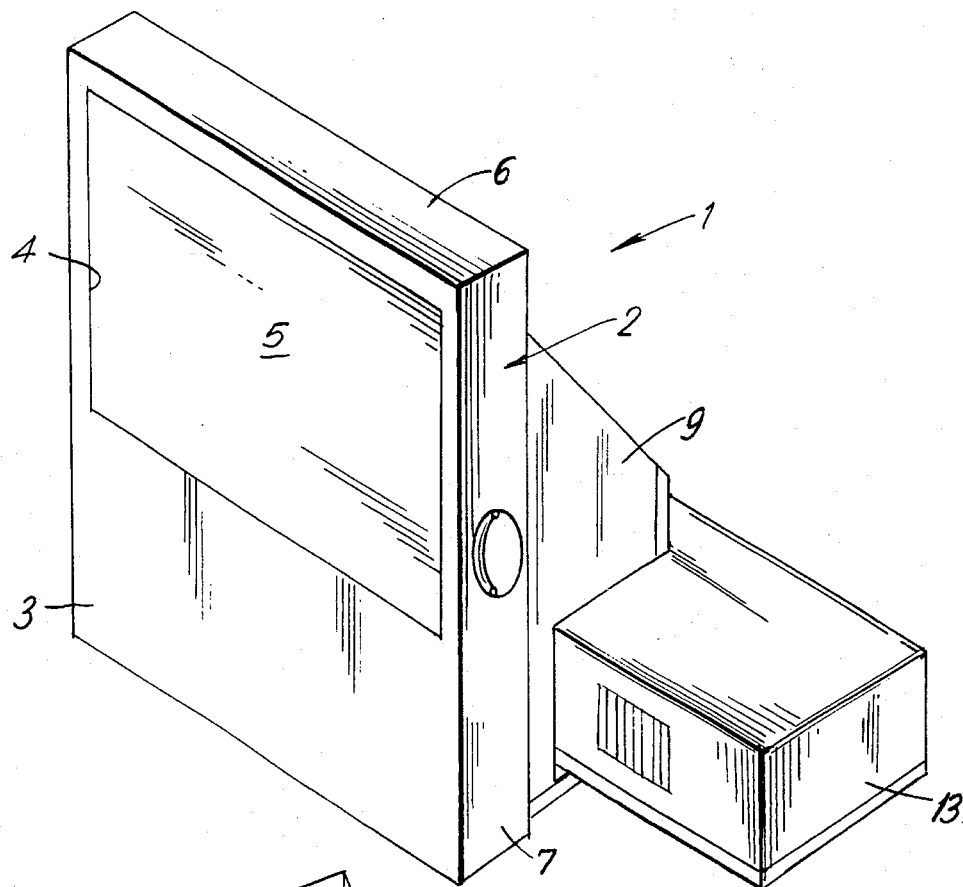
FIG. 7 is a front perspective view of the Portable Rear Screen Television Cabinet with the projector connected.
Figure 8:
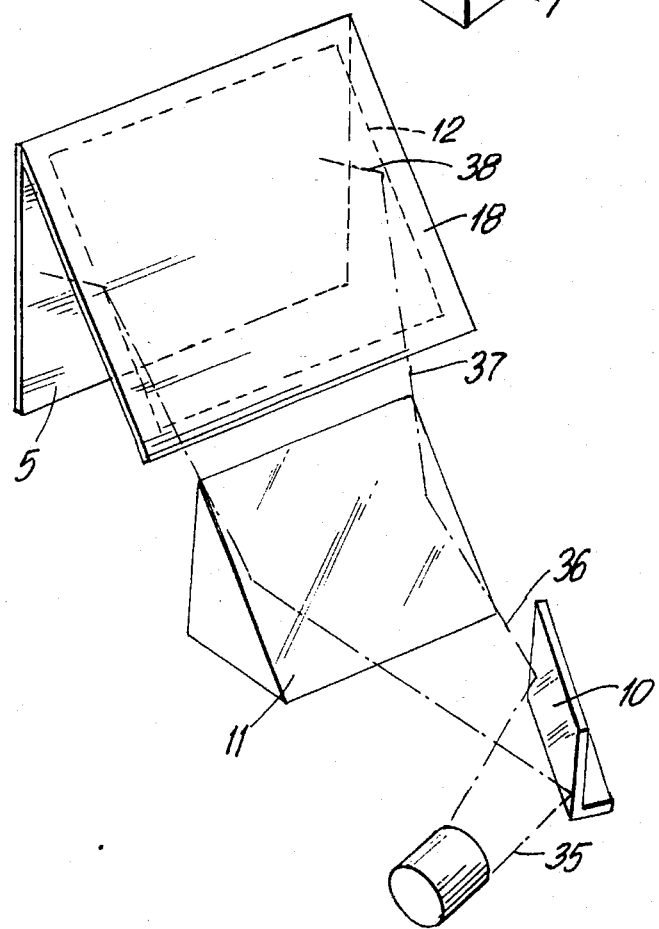
FIG. 8 is a perspective of the mirror system of the Portable Rear Screen Television Cabinet.

Reviewing now the drawings, wherein like numerals reflect like elements throughout the various views, FIG. 1 is a rear perspective view of a portable rear-screen television cabinet 1, comprising a front rectangular structure 2 (see FIG. 7) having a front panel 3 with a large rectangular opening 4 (see FIGS. 3–5 and 7) into which is fitted rear screen 5. The front rectangular structure 2 comprises front panel 3, top plank 6 and two side planks 7, 8. The rear portion 9 (see FIGS. 4–7), as will be demonstrated herein, expands to house a mirror system 10–12 (see FIGS. 4 and 8) which works in connection with a projection device (or "projector") 13 (see FIG. 6), to bring the projected image to the rear screen 5.

Figure 2:
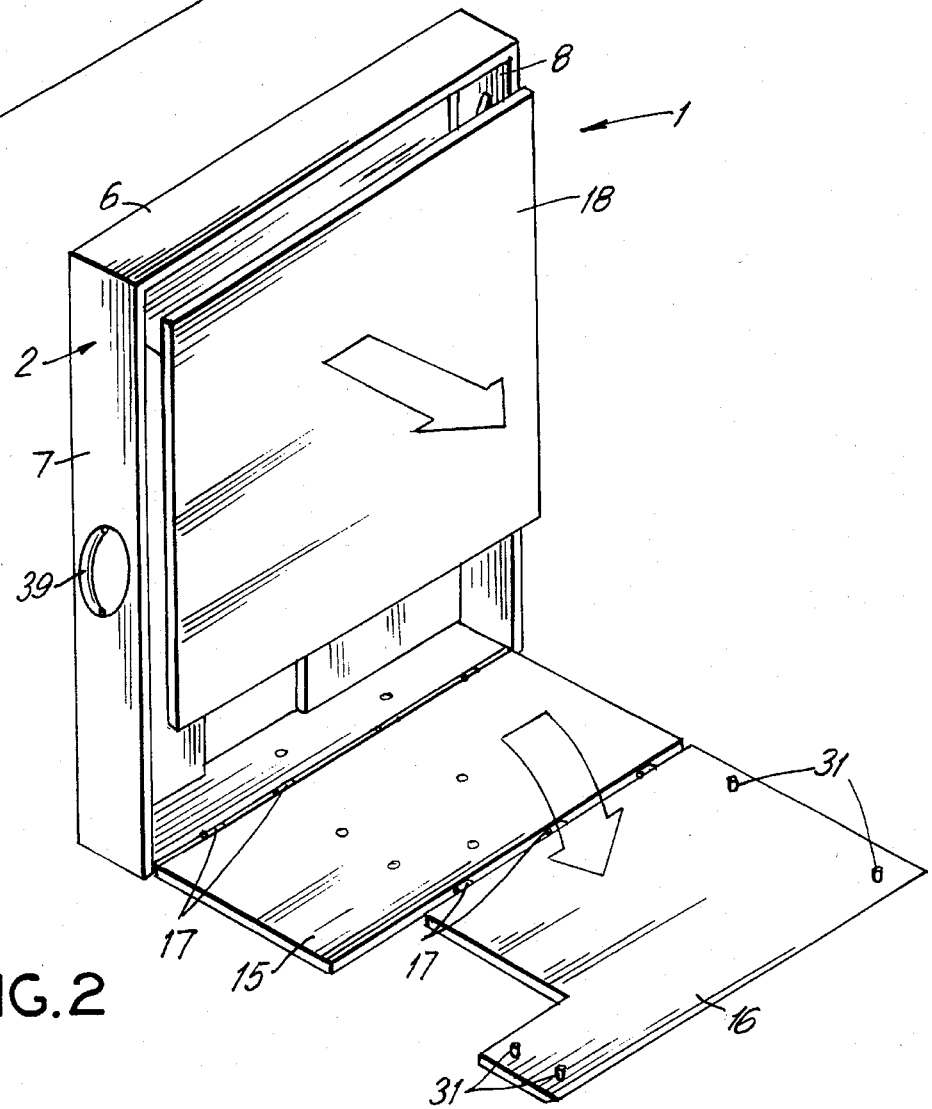
FIG. 2 is a rear perspective view of the Portable Rear Screen Television Cabinet with the base and rear panels swung outward and down and the top panel about to be removed.
Figure 3:
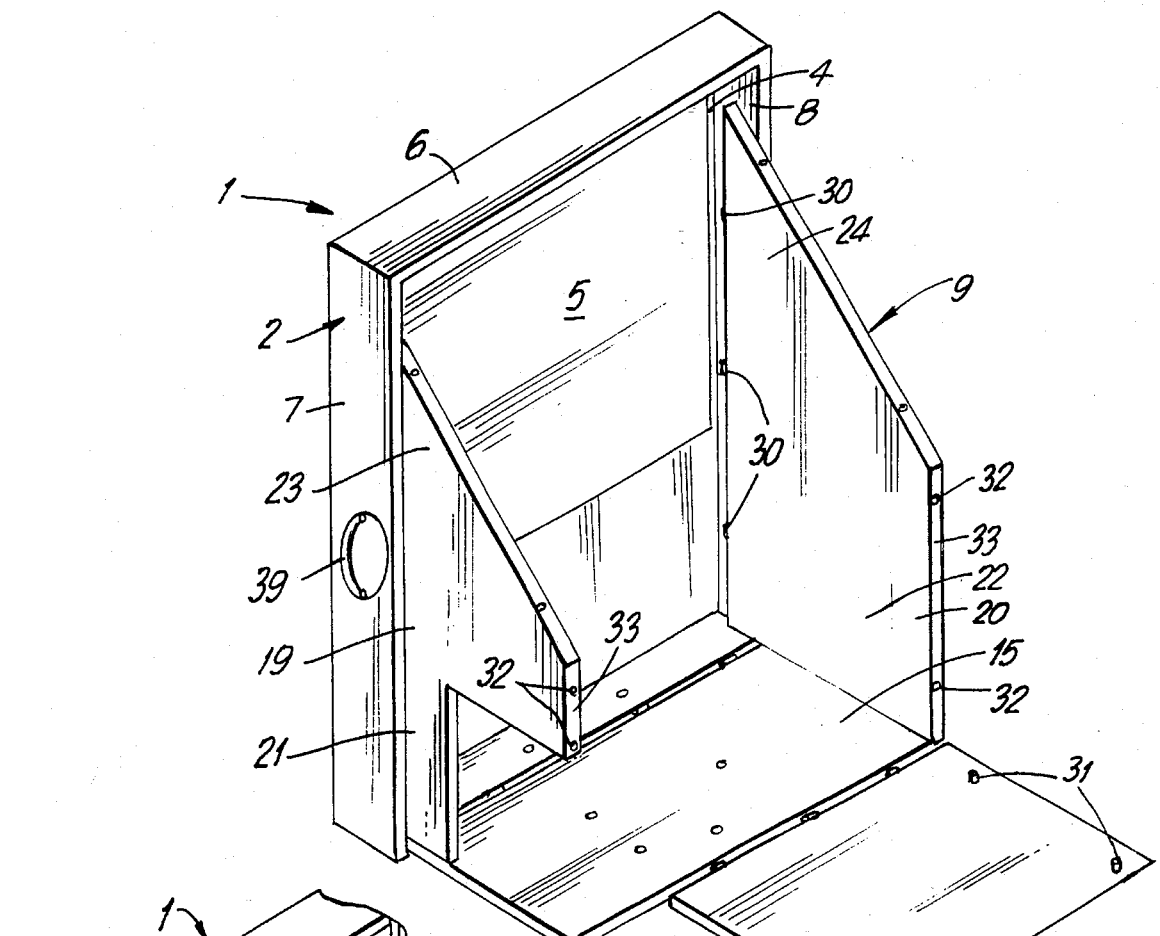
FIG. 3 is a rear perspective view of the Portable Rear Screen Television Cabinet with the side panels swung out into operational position.

The cabinet 1 is set up in its operational layout in the following manner. Pins 14, securing base panel 15 and rear panel 16 are removed permitting the panels 15, 16 to be swung outward and downward using hinges 17, as shown in FIG. 2.

At this juncture, top mirror panel 18, described in more detail later, is removed. Right 19 and left 20 side panels are then swung into operational position using hinges 30. The side panels 19, 20 have generally a rectangular section 21, 22 and a triangular section 23, 24, constructed as a single piece section. A rectangular cut-out 25 on the right panel 19 serves as an opening for a projection device 13. This opening further includes a cornered structure having a surface 26 parallel to the surface on which the overall device rests, a surface 27 which is parallel to the front plane of the rear-screen 5, a surface 28 perpendicular to both of the previous surfaces which contains a preferably circular aperture 29 which permits a beam from the projection device 13 to enter into the cabinet 1 (see also FIG. 8). The rectangular rear panel 16 is hinged to the base panel 15 via a hinging mechanism 17 (see FIG. 2). The hingable rear panel 16 may be swung upwards so that pegs 31 in the rear panel 16 fit corresponding holes 32 on the rear edges 33 of the 16 side panels 19, 20. Other fastening systems may, of course, be used properly to secure the panels. The projection device 13 may be positioned at the right panel 19 on an additional projection device platform surface 34 (see FIG. 6).

A mirror system 10–12, preferably comprises three front surface mirrors, housed within the cabinet 1 to facilitate projection from the projection device 13 onto the rear screen 5. The mirrors 10–12 may be placed into the cabinet 1 at the point in time indicated in FIG. 3 when the rear portion 9 of the cabinet is open, or at the point in time indicated in FIG. 4. In the preferred embodiment, an odd numbered set of mirrors are used to reverse the orientation of the projected image to facilitate correct viewing on the rear screen 5 of the cabinet 1. Mirrors 10–12 may be curved to enlarge the reflected image to thereby decrease the distance between mirrors permitting use of a smaller cabinet.

Preferably, the three mirrors 10–12 are oriented as follows: A first mirror 10 (see FIGS. 4 and 8) is positioned to reflect the incident image 90% from the initial orientation. Thus, the mirror 10 is angled 45° with respect to the angle of the initial projection beam 35 (see FIG. 8). The reflected beam 36 passes to a second mirror 11 which is angled preferably 40° with respect to the vertical and is tilted upwards. Angles smaller that 40° are possible but may cause distortion which could, however, be corrected by building optical correction into the curvature of the mirrors. The beam 36 from the first mirror 10 is reflected (beam 37) off the second mirror 11 to a third mirror 12 which is mounted on top mirror panel 18, diagonally oriented with respect to both the base panel 15 of the cabinet 1, as well as the front panel 3 of the cabinet 1. The third mirror 12 is also angled 40° with respect to the vertical. The beam 38, reflected off this third mirror 12 proceeds to the rear screen 5 for viewing.

Although the sizes of the mirrors 10–12 may vary depending on, for example, the size of the screen 5, the size of the overall assembly, the distance between the mirrors and screen and beam divergence (due to the nature of the projection lens of the projector 13), subsequent mirrors are larger than the previous ones. The mirrors may be secured to any planar structures using standard means and those structures can, in turn, be secured to the overall device by any standard means.

The overall assembly may be easily folded and disassembled in order to fit into a compact unit. To achieve this, the following steps may be taken: First, the projector 13 is removed (see FIG. 5). Second, the top panel mirror 18 having the largest mirror 12 is removed (see FIG. 5). To unfold the rear panel 16 and remove the internal mirrors, the corner structure 25 should be removed as well as the platform 34 (see FIG. 4) The rear panel 16 should be detached from the rear edges 33 of the side panels 19, 20 and the side panels 19, 20 should be swung inward into the front portion 2 of the cabinet 1 (see FIG. 2–3). The top mirror panel 18 may now be secured. The base panel 15 as well as the rear panel 16 are then folded in and secured by pins 14. A recessed handle 39 or any other means may be adapted to the cabinet to facilitate transportation.

Figure 9:
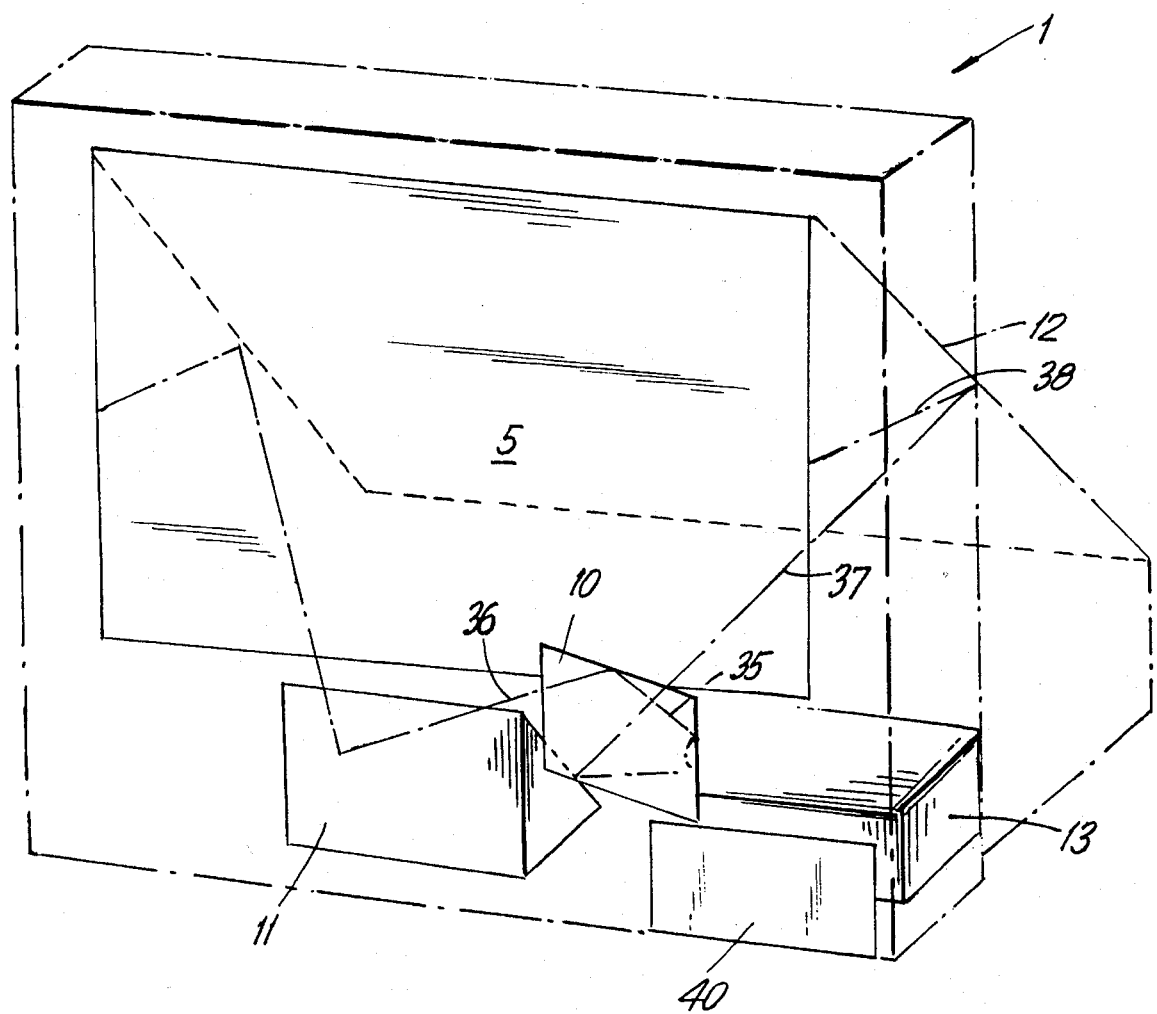
FIG. 9 is a front perspective view of another embodiment of the Portable Rear Screen Television Cabinet.

FIG. 9 depicts a front, perspective view of another embodiment of the portable, rear screen television cabinet 1 which facilitates use of a larger screen 5. In this embodiment, the projector 13 is positioned inside the cabinet 1 through door 40 and the mirror system 10–12 would be positioned as indicated.

While the preferred embodiments of the invention have been depicted in detail, various modifications and adaptations may be made thereto without departing from the spirit and scope of the invention, as delineated in the following claims:

What is claimed is:

1. A collapsible rear screen television cabinet, comprising:
    a front portion having a top, two sides and a front face;
    a rear screen supported on said front face;
    a mirror system comprising at least one mirror for reflecting an image from a projection means onto the rear screen;
    a base panel attached to the front portion to support the projection means in an operational condition of the cabinet; and
    a collapsible rear assembly forming with said front portion substantially closing said cabinet, wherein said cabinet in a collapsed condition has a substantially smaller profile than in the operational condition.

2. The rear screen television cabinet of claim 1, wherein said rear assembly comprises a base panel.

3. The rear screen television cabinet of claim 2, wherein said rear assembly further comprises a rear panel.

4. The rear screen television cabinet of claim 3, wherein said rear assembly comprises top panel.

5. The rear screen television cabinet of claim 4, wherein said rear assembly comprises right and left side panels.

6. The rear screen television cabinet of claim 2, further comprising a base panel hinging means.

7. The rear screen television cabinet of claim 3, further comprising a rear panel hinging means.

8. The rear screen television cabinet of claim 3, wherein said top panel is removable.

9. The rear screen television cabinet of claim 3, wherein said top panel is hinged.

10. The rear screen television cabinet of claim 3, further comprising a top panel fastening means.

11. The rear screen television cabinet of claim 4, wherein said left and right panels are swivelable.

12. The rear screen television cabinet of claim 1, wherein said mirror system comprises a first mirror positioned to receive and reflect an incident beam.

13. The rear screen television cabinet of claim 12, wherein said mirror system further comprises a second mirror positioned to receive and reflect the beam reflected from the first mirror.

14. The rear screen television cabinet of claim 13, wherein said mirror system further comprises a third mirror positioned to receive and reflect the beam reflected from the second mirror to the viewing area.

15. A rear screen television cabinet, comprising:
    a front portion having a top, two sides and a front face;
    a viewing surface on said front face;
    a mirror system comprising at least one mirror for reflecting and successively enlarging and reflecting an incident beam onto the viewing surface, wherein said mirror system comprises:
        a first mirror positioned to receive, enlarge and reflect an incident beam;
        a second mirror positioned to receive, enlarge and reflect the beam reflected from the first mirror;
        a third mirror positioned to receive, enlarge and reflect the beam reflected from the second mirror toward the rear screen;
    a rear assembly combined with said front portion substantially closing said cabinet and wherein said rear assembly is foldable or collapsible to facilitate transportation and wherein said rear assembly, comprises:
        a base panel;
        a rear panel;
        a removable top panel; and
        swivelable right and left side panels.

16. The rear screen television cabinet of claim 13, wherein at least one mirror of the mirror system contains optical power to alter the wavefront of light that hit it in a way other than simple planar reflection.

* * * * *

UNITED STATES PATENT AND TRADEMARK OFFICE
CERTIFICATE OF CORRECTION

PATENT NO. : 5,491,585

DATED : February 13, 1996

INVENTOR(S) : Eugene Dolgoff

It is certified that error appears in the above-indentified patent and that said Letters Patent is hereby corrected as shown below:

On cover page, item, "[73] Assignee: Projectavision, Inc., New York, N.Y.," is deleted.

Signed and Sealed this

Fifth Day of November, 1996

Attest:

BRUCE LEHMAN

Attesting Officer

Commissioner of Patents and Trademarks